US008050701B2

(12) United States Patent
Gorokhov et al.

(10) Patent No.: US 8,050,701 B2
(45) Date of Patent: Nov. 1, 2011

(54) REVERSE LINK POWER CONTROL FOR WIRELESS COMMUNICATION SYSTEMS

(75) Inventors: Alexei Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 11/870,962

(22) Filed: Oct. 11, 2007

(65) Prior Publication Data
US 2009/0098899 A1 Apr. 16, 2009

Related U.S. Application Data (60) Provisional application No. 60/829,388, filed on Oct. 13, 2006.

(51) Int. Cl.
H04W 52/22 (2009.01)
H04W 72/00 (2009.01)
(52) U.S. Cl. ............................ 455/522; 455/69; 455/450
(58) Field of Classification Search .................. None
See application file for complete search history.

(56) References Cited

U.S. PATENT DOCUMENTS

| 7,079,550 | B2 * | 7/2006 | Padovani et al. ............ 370/468 |
| 7,120,134 | B2 * | 10/2006 | Tiedemann et al. ...... 455/522 X |
| 2004/0190485 | A1 * | 9/2004 | Khan ........................... 370/349 |

FOREIGN PATENT DOCUMENTS

| CN | 1533197 A | 9/2004 |
| EP | 1064736 | 1/2001 |
| EP | 1463217 | 9/2004 |
| EP | 1601116 | 11/2005 |
| EP | 1691566 | 8/2006 |
| GB | 2417167 | 2/2006 |
| RU | 2260913 | 9/2005 |
| WO | 9844755 | 10/1998 |
| WO | WO0186834 A1 | 11/2001 |

OTHER PUBLICATIONS

J. Borran, "RL Traffic Power Control for LBC FDD," 3GPP2, C30-20060911-089, Sep. 11, 2006, pp. 1-16, XP002473036.
A. Gorokhov, "Forward Link Signaling Enhancements for LBC FDD," 3GPP2, C30-20061030-069, Oct. 30, 2006, pp. 1-11, XP002473037.
International Search Report, PCT/US07/081238, International Search Authority, European Patent Office, Apr. 2, 2008.
Written Opinion, PCT/US07/081238, International Search Authority, European Patent Office, Apr. 2, 2008.
Translation of Office Action in Russian application 200911781 corresponding to U.S. Appl. No. 11/870,962, citing EP1463217, RU2260913, WO9844755, GB2417167 and EP1691566 dated Feb. 28, 2011.

* cited by examiner

Primary Examiner — Philip J Sobutka
(74) Attorney, Agent, or Firm — Nerrie M. Zohn (57) ABSTRACT

Assigning power spectrum density to access terminals within a wireless network environment is provided. Assignment information that includes assignment of reverse link transmission resources is determined and a power control instruction is created for the assigned reverse link transmission resource. An assignment message that includes both the assignment information and the power control instruction is formatted and communicated to the access terminals. The assignment message includes a Reverse Link Power Control field that indicates a transmit power spectral density assigned by the access point to the reverse-link transmission by the terminal.

29 Claims, 9 Drawing Sheets

| Field | Block Type | MAC ID | Persistent | Chan ID | PF | Ext. TX | Timing | Suppl. | Rank |
|---|---|---|---|---|---|---|---|---|---|
| # bits | 3 | 9-11 | 1 | 6-8 | 4-6 | 1 | 6 | 1 | 2 |
| Access Grant | 000 | 1 | 0 | 0 | 0 | 0 | 1 | 0 | 0 |
| FLAB | 001 | 0 | 1 | 1 | 1 | 1 | 0 | 1 | 0 |
| RLAB | 010 | 0 | 1 | 1 | 1 | 1 | 0 | 1 | 0 |
| MCW FLAB1 | 011 | 0 | 1 | 1 | 1 | 1 | 0 | 1 | 0 |
| MCW FLAB2 | 100 | 0 | 0 | 0 | 3 | 0 | 0 | 0 | 0 |
| SCW FLAB | 101 | 0 | 1 | 1 | 1 | 1 | 0 | 1 | 1 |
| Field | Block Type | MAC ID | Persistent | Chan ID | PF | Ext. TX | Timing | Suppl. | Rank |
| # bits | 3 | 9-11 | | | 1 | | | 6-8 | |

FIG. 4

| Field | Block Type | MAC ID | Persistent | Chan ID | PF | H-ARQ | Ext. TX | Timing | Suppl. | Rank | RLPC |
|---|---|---|---|---|---|---|---|---|---|---|---|
| # bits | 4 | 9-11 | 1 | 6-8 | 4-6 | 1 | 1 | 6 | 1 | 2 | 5 |
| Access Grant | 0000 | 1 | 0 | 0 | 0 | 0 | 0 | 1 | 1 | 0 | 0 |
| FLAB | 0001 | 0 | 1 | 1 | 1 | 1 | 0 | 0 | 0 | 0 | 0 |
| RLAB | 0010 | 0 | 1 | 1 | 1 | 1 | 1 | 0 | 1 | 0 | 1 |
| MCW FLAB1 | 0011 | 0 | 1 | 1 | 1 | 1 | 0 | 0 | 1 | 0 | 0 |
| MCW FLAB2 | 0100 | 0 | 0 | 0 | 3 | 1 | 0 | 0 | 1 | 0 | 0 |
| SCW FLAB | 0101 | 0 | 1 | 1 | 1 | 1 | 0 | 0 | 0 | 1 | 0 |
| SP FLAB | 0110 | 0 | 0 | 1 | 1 | 1 | 0 | 0 | 1 | 0 | 0 |
| SP MCW FLAB1 | 0111 | 0 | 0 | 1 | 1 | 1 | 0 | 0 | 1 | 0 | 0 |
| SP MCW FLAB | 1000 | 0 | 0 | 1 | 1 | 1 | 0 | 0 | 1 | 1 | 0 |
| PDCAM | 1001 | Contains a two-bit sub-bitmap index and bit mask of unused F-SCCH resources. | | | | | | | | | |

REVERSE LINK POWER CONTROL FOR WIRELESS COMMUNICATION SYSTEMS

CROSS-REFERENCE

This application claims the benefit of U.S. Provisional Application Ser. No. 60/829,388, filed Oct. 13, 2006, entitled "CONTROL CHANNEL FOR WIRELESS COMMUNICATION". The entirety of this application is incorporated herein by reference.

BACKGROUND

I. Field

The following description relates generally to wireless communication systems, and amongst other things to transmitting assignment messages in a wireless communication system.

II. Background

Wireless communication systems are widely deployed to provide various types of communication such as voice, data, and so forth. These systems may be multiple-access systems capable of supporting communication with multiple access terminals by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station communicates with the mobile station using a forward link (or downlink) and each mobile station (or access terminal) communicates with the base station using a reverse link (or uplink).

A wireless multiple-access communication system can concurrently communicate with multiple terminals on the forward and reverse links. Multiple terminals may simultaneously transmit data on the reverse link and/or receive data on the forward link. This is often achieved by multiplexing the transmissions on each link to be orthogonal to one another in time, frequency and/or code domain.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with assigning power and/or power spectrum density within a wireless network environment.

In accordance with an aspect is a method for transmitting an assignment message. The method includes generating assignment information for at least one terminal. The assignment information can include assignment of reverse link transmission resources. The method also includes generating a power control instruction of the at least one terminal for the assigned reverse link transmission resource and generating an assignment message that includes both the assignment information and the power control instruction. The assignment message can be transmitted to the at least one terminal.

In a related aspect is a wireless communications apparatus that includes a memory and a processor. The memory can store information related to instructions generated by the processor. The processor can execute instructions for generating an assignment message including both assignment information assigning reverse link transmission resources for at least one terminal and a power control instruction for the assigned reverse link transmission resources and to instruct transmission of the assignment message to the at least one terminal.

Another aspect relates to a wireless communications apparatus that transmits an assignment message. The apparatus can include a means for generating assignment information for at least one terminal and assigning reverse link transmission resources and a means for generating a power control instruction of the at least one terminal for the assigned reverse link transmission resources. Also included in the apparatus can be a means for generating an assignment message including both the assignment information and the power control instruction and a means for transmitting the assignment message to the at least one terminal.

A further aspect relates to a machine-readable medium having stored thereon machine-executable instructions for determining assignment information for at least one terminal, and creating a power control instruction of the at least one terminal for the assigned reverse link transmission resource. The assignment information can include assignment of reverse link transmission resources. The machine-executable instructions are also for formatting an assignment message that includes both the assignment information and the power control instruction and sending the assignment message to the at least one terminal.

An apparatus operable in a wireless communication system is a related aspect. The apparatus includes a processor configured to determine assignment information for at least one terminal, the assignment information includes assignment of reverse link transmission resources. The processor can also be configured to create a power control instruction of the at least one terminal for the assigned reverse link transmission resource and format an assignment message that includes both the assignment information and the power control instruction. The assignment message can be communicated to the at least one terminal.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules and/or may not include all of the devices, components, modules discussed in connection with the figures. A combination of these approaches may also be used.

Figure 1:
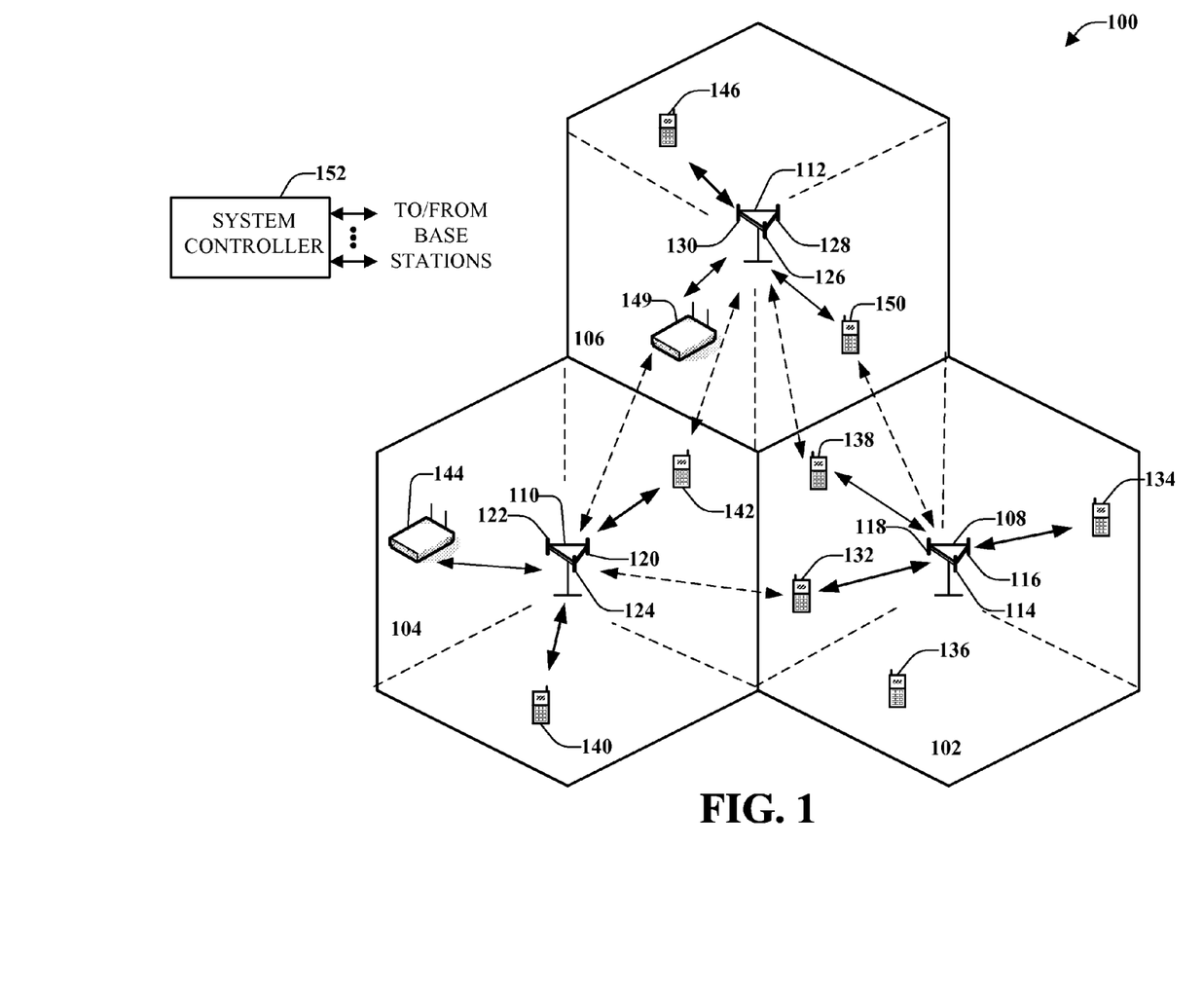
FIG. 1 illustrates a multiple access wireless communication system according to various embodiments for providing control channels.

FIG. 1 illustrates a multiple access wireless communication system 100 according to various embodiments for providing control channels. In further detail, a multiple access wireless communication system 100 includes multiple cells, e.g. cells 102, 104, and 106. The term "cell" can refer to an access point and/or its coverage area depending on the context in which the term is used. In the embodiment of FIG. 1, each cell 102, 104, and 106 can include an access point 108, 110, 112 that includes multiple sectors. The term "sector" can refer to an access point and/or its coverage area depending on the context in which the term is used. The multiple sectors are formed by groups of antennas each responsible for communication with access terminals in a portion of the cell. In cell 102, antenna groups 114, 116, and 118 each correspond to a different sector. In cell 104, antenna groups 120, 122, and 124 each correspond to a different sector. In cell 106, antenna groups 126, 128 and 130 each correspond to a different sector.

For a sectorized cell, the access points for all sectors of that cell are typically co-located within the base station for the cell. The signaling transmission techniques described herein can be used for a system with sectorized cells as well as a system with un-sectorized cells. For simplicity, in the following description, the term "base station" is used generically for a station that serves a sector as well as a station that serves a cell. A base station is a station that communicates with the terminals. A base station may also be called, and may contain some or all of the functionality of, an access point, a Node B, and/or some other network entity.

Each cell includes several access terminals, which are in communication with one or more sectors of each access point. Terminals are typically dispersed throughout the system, and each terminal can be fixed or mobile. A terminal may also be called, and may contain some or all of the functionality of, a mobile station, a user equipment, and/or some other device. A terminal can be a wireless device, a cellular phone, a personal digital assistant (PDA), a wireless modem card, and so on. A terminal can communicate with zero, one, or multiple base stations on the forward and reverse links at any given moment. For example, access terminals 132, 134, 136, and 138 are in communication with base station 108, access terminals 140, 142, and 144 are in communication with access point 110, and access terminals 146, 149, and 150 are in communication with access point 112.

As illustrated in cell 104, for example, each access terminal 140, 142, and 144 is located in a different portion of it respective cell than each other access terminal in the same cell. Further, each access terminal 140, 142, and 144 can be a different distance from the corresponding antenna groups with which it is communicating. Both of these factors provide situations, also due to environmental and other conditions in the cell, to cause different channel conditions to be present between each access terminal and its corresponding antenna group with which it is communicating.

A controller 152 is coupled to each of the cells 102, 104, and 106 and provides coordination and control for the respective base stations. Controller 152 can be a single network entity or a collection of network entities. For a distributed architecture, the base stations can communicate with one another as needed. Controller 152 can contain one or more connections to multiple networks, such as the Internet, other packet based networks, or circuit switched voice networks that provide information to, and from, the access terminals in communication with the cells of the multiple access wireless communication system 100. Controller 152 includes, or is coupled with a scheduler that schedules transmission from and to access terminals. In some embodiments, scheduler can reside in each individual cell, each sector of a cell, or a combination thereof.

It should be noted that while FIG. 1, depicts physical sectors (e.g. having different antenna groups for different sectors), other approaches can be utilized. For example, utilizing multiple fixed "beams" that each cover different areas of the cell in frequency space can be utilized in place of, or in combination with, physical sectors.

One or more aspects of a wireless communication system design is described herein that supports full and half duplex frequency division duplex (FDD) and time division duplex (TDD) modes of operation, with support for scalable bandwidth. However, this need not be the case, and other modes can also be supported, in addition to, or in place of the previous modes. The system employs an Orthogonal Frequency Division Multiple Access (OFDMA) forward link (FL) with antenna techniques like multiple input multiple output (MIMO) and Spatial Division Multiple Access (SDMA) support. However, such antenna techniques need not be supported.

In some aspects, the reverse link can be quasi-orthogonal (e.g. it employs orthogonal transmission based on OFDMA and non-orthogonal transmission with multiple receive antennae). Further, in some aspects, interference management can be obtained through fractional frequency reuse (FFR) improving coverage and edge user performance. Further, in one or more aspects the FFR can be a dynamic FFR that optimizes bandwidth utilization. In an aspect, the reverse link employs a CDMA, OFDMA, TDMA, or a combination thereof control segment with statistical multiplexing of the various control channels. In an aspect, the system employs fast access with reduced overhead and fast request. In accordance with some aspects, the reverse link employs a broadband reference signal for power control and subband scheduling. Efficient handoff support can also be provided, in one or more aspects.

In some aspects, multiple antenna techniques can include forward link precoding and SDMA, multiple input single output/multiple input multiple output (MISO/MIMO) closed loop precoding with low-rate feedback. In an aspect, single codeword (SCW) MIMO schemes with closed loop rate and rank adaptation can also be supported, while multi-codeword (MCW) or layered MIMO with per-layer rate adaptation can also be utilized.

Figure 2:
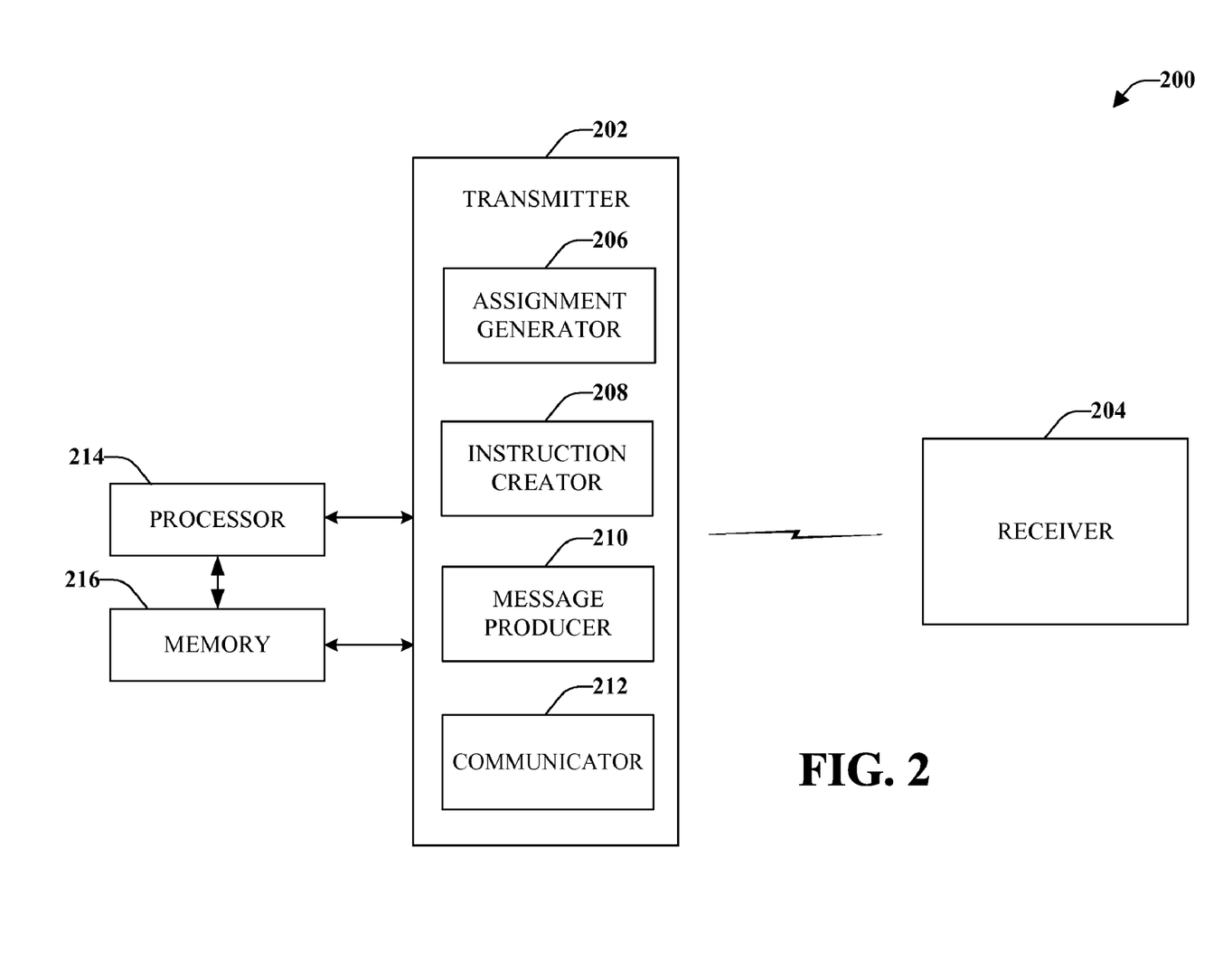
FIG. 2 illustrates an example system that assigns channel resources in a wireless communication environment.

FIG. 2 illustrates an example system 200 that assigns channel resources in a wireless communication environment. System 200 includes a transmitter 202 that is in wireless communication with a receiver 204. Transmitter 202 can be a base station and receiver 204 can be a communication device, for example. It should be understood that system 200 could include one or more transmitters 202 and one or more receivers 204. However, only one receiver and only one transmitter are shown for purposes of simplicity.

Transmitter 202 can be configured to assign channels (e.g., resources) explicitly to each receiver 204 and communicate an assignment message to one or more receivers 204. Transmitter 202 can include an assignment generator 206 that can be configured to produce assignment information for at least one receiver 204. The assignment generator 206 can further be configured to assign reverse link transmission resources.

Also included in transmitter 202 can be an instruction creator 208 that can be configured to generate a power control instruction of the one or more receivers 204 for the assigned reverse link transmission resources. The instructions can include generating an n-bit number, where n is an integer. In accordance with some aspects, n is equal to five. The instruction creator 208 can generate the power control instruction based on a packet format that is included in the assignment information.

A message producer 210 can be configured to generate an assignment message that can include either or both the assignment information and the power control instruction. The assignment message can include a Reverse Link Power Control (RLPC) field 508 that indicates a transmit power spectral density (PSD) assigned by the access point to the reverse-link transmission by the terminal. In an aspect, the RLPC may be quantized to a n-bit number associated with the assigned packet format, where n is an integer. In accordance with some aspects, the RLPC field contains a special value that indicates the at least one terminal should retain its current power spectral density value. Alternatively, the RLPC field includes a target carrier to interference ratio in order for the at least one terminal to infer a corresponding transmit power spectral density value based on an advertised interference-over-thermal level This assignment message is sent to receiver 204 by a communicator 212 that is configured to send and/or receive communications from one or more receivers 204. Further information relating to signaling messages will be discussed in further detail below with reference to FIGS. 4 and 5.

System 200 can include a processor 214 operatively connected to transmitter 202 (and/or a memory 216) to execute instructions relating to generating an assignment message that includes either or both assignment information and a power control instruction for one or more receivers 204. The power control instruction can be for an assigned reverse link transmission resource. Processor 214 can also execute instructions relating to transmission of the assignment message to the one or more receivers 204.

In accordance with some aspects, processor 214 can execute instructions relating to generating assignment information for one or more receivers 204 and/or assigning reverse link transmission resources. Processor 214 can also execute instructions relating to generating a power control instruction of the one or more receivers 204 for the assigned reverse link transmission resources.

Processor 214 can be a processor dedicated to analyzing and/or generating information received by transmitter 202. Processor 214 can also be a processor that controls one or more components of system 200, and/or a processor that both analyzes and generates information received by transmitter 202 and controls one or more components of system 200.

Memory 216 can store information related to the instructions executed by processor 214 and other suitable information related to transmitting information in a wireless communication network. Memory 216 can further store information for taking action to control communication between transmitter 202 and receiver 204 such that system 200 can employ stored protocols and/or algorithms for transmitting information in a wireless network as described herein.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 216 of the disclosed embodiments are intended to comprise, without being limited to, these and other suitable types of memory.

Figure 3:
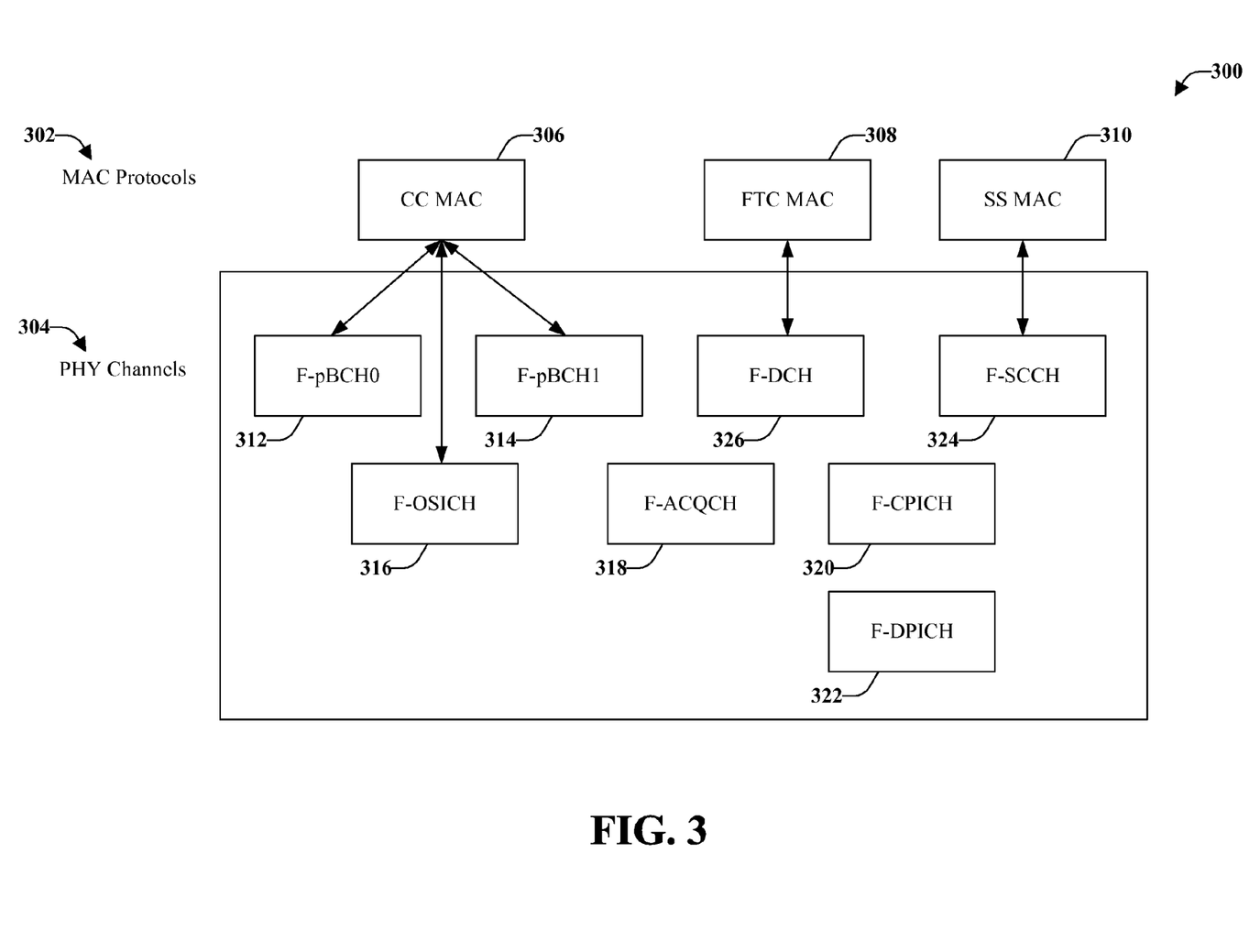
FIG. 3 illustrates forward link control channels in accordance with the various aspects.

With reference now to FIG. 3, illustrated are forward link control channels 300 in accordance with the various aspects. It should be understood that the forward link control channels 300 illustrated and described are exemplary and other channels can be used, some of the channels can be omitted, or combinations thereof can be utilized. The exemplary forward link control channels 300 can be utilized for Ultra High Data Rate (UHDR)-One FDD.

Medium Access Control (MAC) Protocols 302 are illustrated at the top of the figure and the Physical (PHY) Channels 304 are illustrated at the bottom of the figure. The MAC Protocols 302 can include a Control Channel (CC) MAC 306, a Forward Traffic Channel (FTC) MAC 308, and a Shared Signal (SS) MAC 310.

The PHY channels 304 can include a first forward link Primary Broadcast Channel (F-pBCH0) 312, a second forward link Primary Broadcast Channel (F-pBCH1) 314, and a forward link other sector interference indicator channel (F-OSICH) 316. F-pBCH0 312 is a broadcast channel that carries deployment specific parameters. F-pBCH1 314 is a broadcast channel that carries sector specific parameters. F-OSICH 316 is a broadcast channel that carries an indication of inter-sector interference.

Also included in the PHY channels 304 can be a forward link Acquisition Channel (F-ACQCH) 318, a forward link Common Pilot Channel (F-CPICH) 320 and a forward link Dedicated Pilot Channel (F-DPICH) 322. Other PHY channels 304 can include a Shared Control Channel (F-SCCH) 324 that carries forward link control signaling. Included also is a Data (Traffic) Channel (F-DCH) 326 that can support Quadrature Phase Shift Keying (QPSK), 8PSK (phase synchronization), 16QAM (quadrature amplitude modulation), 64QAM, and/or other modulation formats, thus allowing a wide range of spectral efficiencies.

The forward-link control channels are utilized to assign and manage forward-link and reverse-link resources. In some aspects, the forward-link control channels can be utilized to specify respective packet formats, grant access to users in the idle state, acknowledge reverse-link transmissions, send reverse-link power control commands, send other sector interference indications, or combinations thereof. The forward-link control channels can be combined in a single physical layer channel called forward-link shared control channel (F-SCCH), although the combination may also be logical resources, or may be separate channels.

Figure 4:
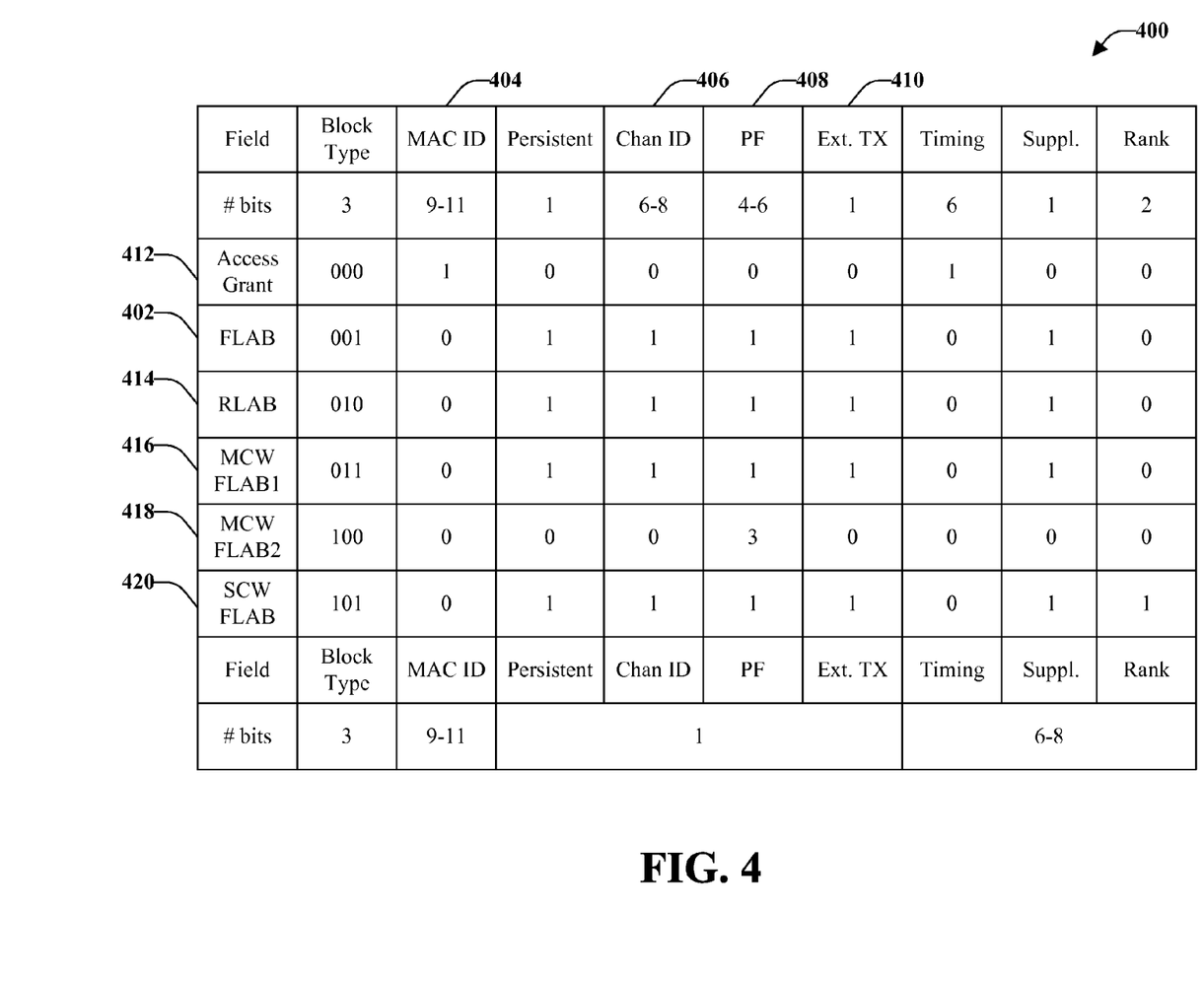
FIG. 4 illustrates a structure of exemplary forward-link signaling blocks.

A selection of forward-link signaling messages, referred to as "blocks", are illustrated in FIG. 4, which includes the structure of exemplary forward-link signaling blocks. The term block is not limited to any specific transmission or channelization structure. Columns of the table 400 indicate different fields while rows correspond to different signaling blocks. Every cell in the table indicates multiplicity of a given field. An x-bit block type field, where x is an integer, allows the terminal to identify the type of block and therefore interpret the subsequent fields. The set of information bits of every block is extended by a 16-bit Cyclic Redundancy Check (CRC) to help facilitate reliable detection.

A message called a non-persistent forward-link assignment block (FLAB) 402 contains the MAC ID 404 of the target terminal, which can be a broadcast MAC ID 404. A channel ID (Chan ID) 406 indicates the hop-ports assigned (e.g., by the channel tree in use). The FLAB message 402 also contains the packet format (PF) 408 to use, the number of PHY frames occupied by this assignment and an indication (denoted by Ext TX 410) of whether or not to use the extended transmission duration for the assignment (each H-ARQ transmission spans multiple PHY Frames). The PF 408 can specify modulation, coding and dedicated pilot format. Unlike other assignments that last until explicitly de-assigned or lost due to packet failure, this assignment lasts for a predefined number of frames and is primarily used to transmit a broadcast or multicast message.

The Access Grant message 412 is utilized to acknowledge an access attempt by a terminal, assign a new MAC ID 404 along with the initial reverse-link channel assignment and PF 408, and supply a 6-bit timing adjustment for the terminal to align its reverse-link transmission with the reverse-link timing of the access node or base station. The sequence of modulation symbols corresponding to the Access Grant 412 is scrambled according to the index of the preceding access probe transmitted by the terminal. This enables the terminal to respond only to Access Grant blocks that correspond to the probe sequence that it transmitted.

The forward-link assignment block (FLAB) 402 signals a forward-link resource assignment to an active terminal (MAC ID) with resources assigned indicated by ChanID 406 and spectral efficiency indicated by PF 408. A field in this message is the supplemental assignment flag. If the supplemental assignment flag is set, it indicates an incremental assignment that takes effect starting from the new packet. If the supplemental assignment flag is not set, the new assignment replaces the existing assignment. The reverse-link assignment block (RLAB) 414 signals reverse-link resource assignments similar to a forward-link assignment block (FLAB).

It should be noted that any assignment message automatically de-assigns resources from the terminal that is currently using resources corresponding to the Chan ID indicated in the assignment message. Therefore, assignment messages are often multicast since they target both the intended recipient of the assignment as well as any current owners of the resources specified by the assignment.

The multi-codeword (MCW) FLAB 416 and 418 is a forward-link assignment block that can be used for terminals in the MIMO multi-codeword mode. Unlike other assignment messages, the MCW FLAB 416 and 418 indicates four packet formats corresponding to (at most) four MIMO layers (codewords). This assignment message is split into two parts as shown in the Table 400. In the event that the number of layers in use is less than four, the remaining PF fields are set to zero. The single-codeword (SCW) MIMO FLAB 420 is similar to the FLAB, except that it also indicates rank of the MIMO transmission.

Figure 5:
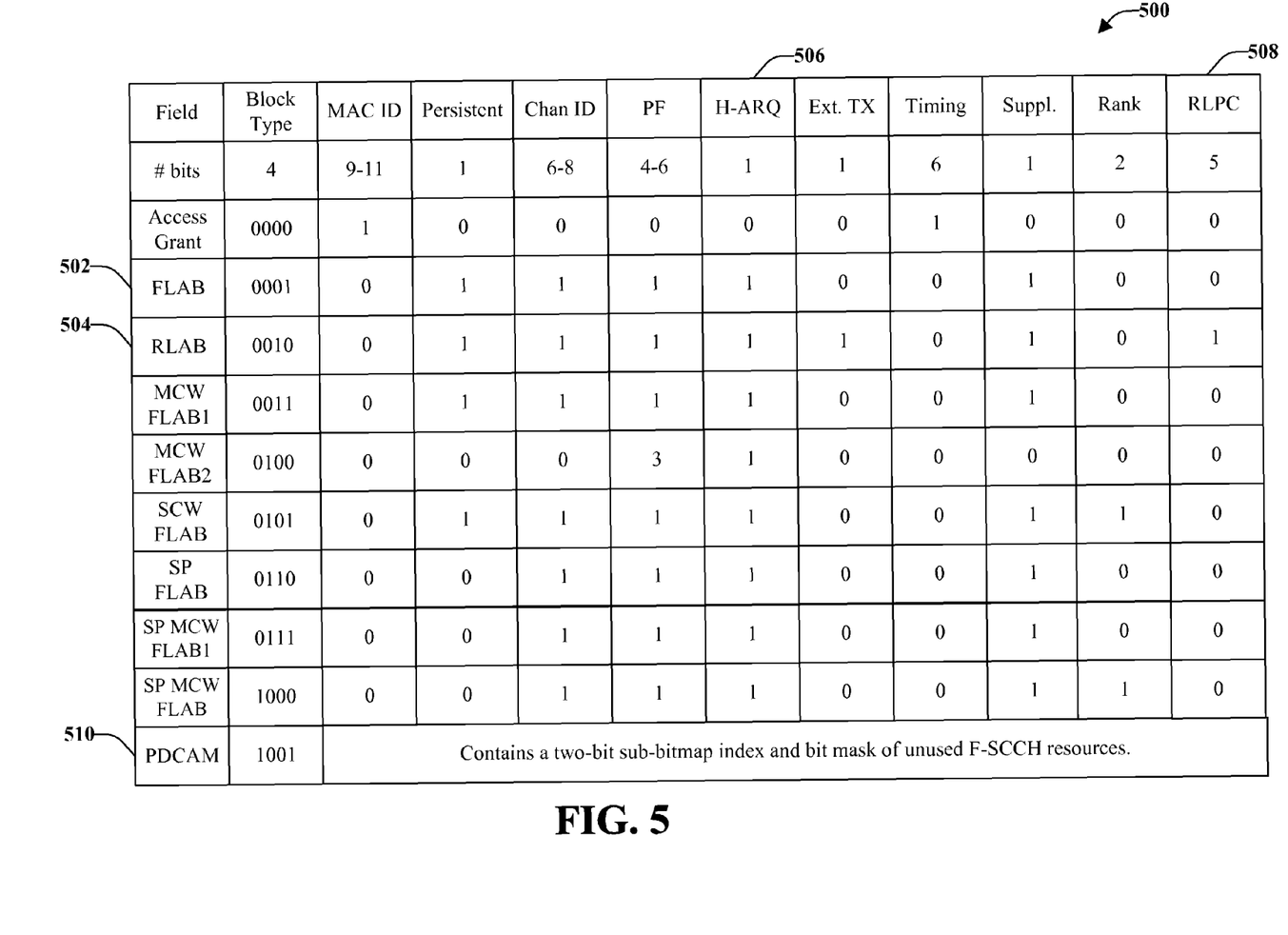
FIG. 5 illustrates an aspect of a forward-link Shared Signaling Channel in a table format.

FIG. 5 illustrates another aspect of a F-SCCH in a table format 500. In accordance with an aspect, a FLAB 502 or RLAB 504 may include a one-bit field 'H-ARQ' 506 that indicates a H-ARQ timeline utilized. The H-ARQ 506 utilized can be one of two or more possible timelines. For example, a transmission time interval of eight interlace versus an alternative of six interlaces may be utilized.

In the aspect described above, a Reverse Link Power Control (RLPC) field 508 for RLAB 504 is included. The RLCP field 508 indicates a transmit PSD assigned by the access point to the reverse-link transmission by the terminal. In an aspect, this may be quantized to a n-bit number associated with the assigned packet format, where n is an integer.

Further, in an aspect, a packet data control assignment (PDCAM) message 510 according to the adaptive resource sharing may be utilized as part of SCCH. The PDCAM 510 can contain a two-bit sub-bitmap index and bit mask of unused F-SCCH resources. In an aspect, a bitmap of unused F-SCCH segments can include multiple sub-bitmaps so that each sub-map fits within an F-SCCH segment.

Additionally, superposed Forward Link SIMO and MIMO assignments may be included in the FLABs. For example, these assignments can utilize resources persistently assigned to other terminals. Further, resources assigned persistently to other terminals are utilized when idle, as indicated by the keep-alive bitmap consistent with the proposal of bitmap keep-alive transmission.

In accordance with some aspects, a superposed assignment can be a non-persistent Forward Link assignment that includes resources persistently assigned to other terminals. In an aspect, a terminal is assigned a collection of resources (e.g., nodes (ChanIDs)) where certain nodes are persistently assigned to other terminals. In further aspects, all F-DCH resources (ChanIDs) unused in a given frame are modulated with the data for superposed assignment. In an aspect, this can include resources not assigned to other terminals as well as resources persistently assigned to other terminals but being idle in the current frame. However, only some of the options may be utilized.

In an aspect, a terminal with a superposed assignment demodulates keep-alive bitmap to determine which resources within its assignment are available. To acknowledge (ACK) a message received in a superposed assignment, a terminal can send an acknowledgement on an ACK channel or segments associated with the 'available' node with the lowest Chan ID. In the case of MCW superposed assignments, acknowledgements for N layers may be sent on ACK channels or segments associated with the lowest N Chan IDs.

In an aspect, an access terminal can, when receiving an xLAM with a NULL PF with a supplemental flag='0', interpret the xLAM as indicating a resource reassignment with the new resource defined by Chan ID. This can be, for example, a reassignment that applies to the subsequent H-ARQ transmission.

In an aspect, an access terminal may, when receiving an xLAM with NULL PF with supplemental flag='1', interpret the xLAM as indicating an extension of the current assignment for additional maximum number of H-ARQ transmissions. This can be, for example, interpreted that a valid ChanID indicates new resource and that an invalid ChanID keeps old resource.

Additionally or alternatively, an access terminal can, when receiving an xLAM with supplemental flag='0' and invalid ChanID and the terminal has a valid assignment, interpret the xLAM as indicating de-assignment. Further, in accordance with an aspect, an access terminal can, when receiving an xLAM with supplemental flag='1' and invalid ChanID and the terminal has a valid assignment, interpret the xLAM as indicating suspension of the current assignment.

In accordance with a further aspect, an access terminal may, when receiving an xLAM with supplemental flag='1' and invalid ChanID and the terminal has a suspended assignment, interpret the xLAM as indicating resumption of the suspended assignment. This can be, for example, interpreted that a valid ChanID indicates new resource and that an invalid ChanID keeps old resource.

It should be noted that one or more of the above discussed messages can be combined into a single message or be spread across two or more messages.

The F-SCCH may be a FDM, or other channelized channel present in each PHY Frame. The F-SCCH bandwidth is subdivided into a number of segments of predefined sizes. The segmentation information is signaled in an overhead channel. The first segment carries signaling messages and may be zero-padded if not fully used. Modulation symbols of each message can be interleaved across the entire F-SCCH assignment to ensure maximum diversity.

Figure 6:
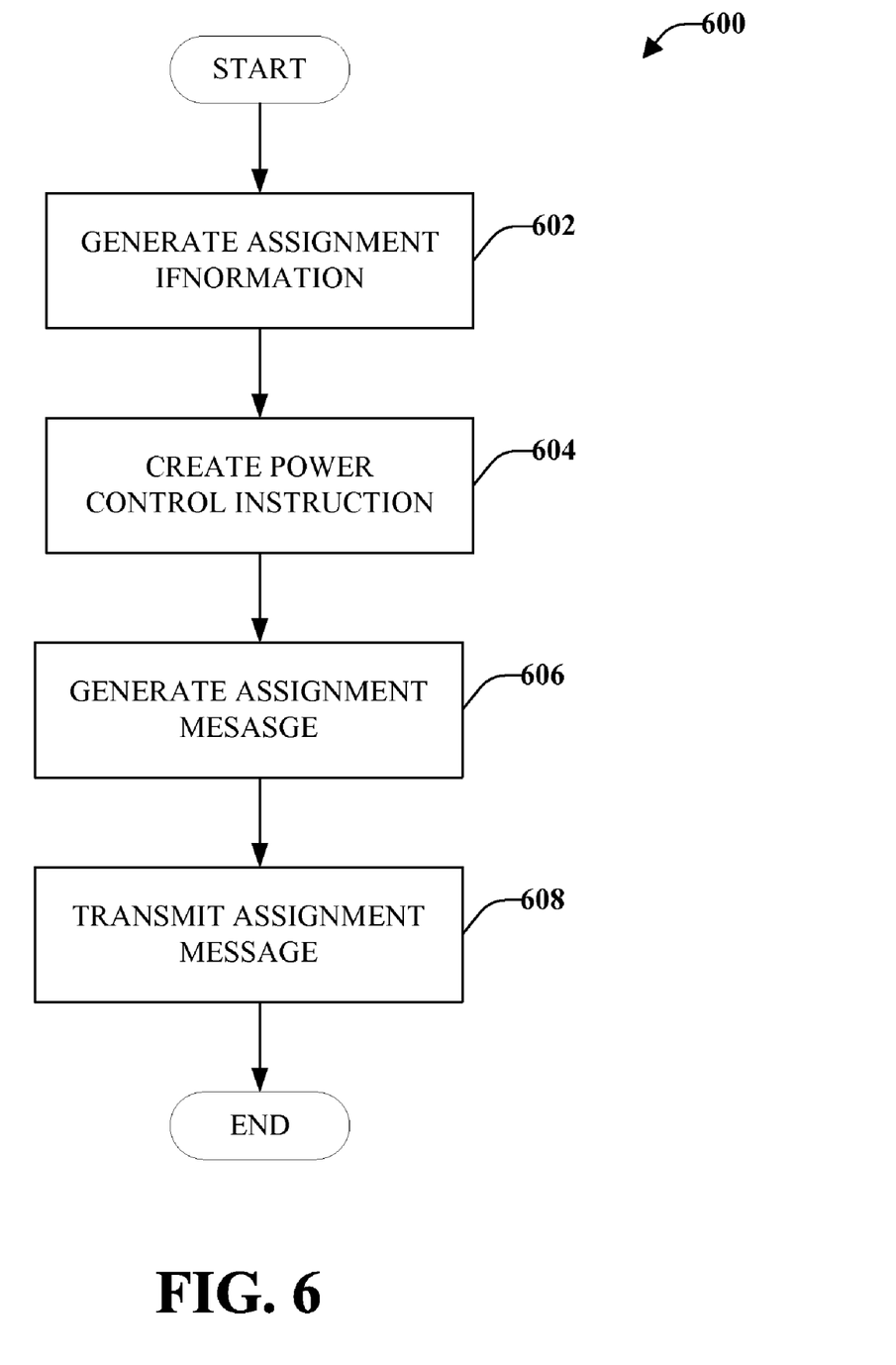
FIG. 6 illustrates a method for transmitting an assignment message.

FIG. 6 illustrates a method 600 for transmitting an assignment message. While, for purposes of simplicity of explanation, the method is shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methods described. It is to be appreciated that the functionality associated with the blocks may be implemented by software, hardware, a combination thereof or any other suitable means (e.g. device, system, process, component). Additionally, it should be further appreciated that the method disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Method 600 starts, at 602, when assignment information is generated for one or more terminals. The assignment information can include assigning reverse link transmission resources. Power control instructions are created, at 604. The power control instruction is for one or more terminals and is for the assigned reverse link transmission resources. Creating the power control instruction can include generating an n-bit number. In accordance with some aspects, creating the power control instruction is based upon a packet format included in the assignment information.

At 606, an assignment message is generated. The assignment message can include both the assignment information and the power control instruction. The assignment message can include a Reverse Link Power Control (RLPC) field 508 that indicates a transmit power spectral density (PSD) assigned by the access point to the reverse-link transmission by the terminal. In accordance with some aspects, a terminal can receive a (target) interference-over-thermal level (IoT) advertised by the access point and can convert the (IoT into a PSD that is defined in terms of target carrier to interference (C/I) ratio or Signal-to-Noise Ratio (SNR). In an aspect, the RLPC may be quantized to a n-bit number associated with the assigned packet format, where n is an integer. At 608, the assignment message is transmitted to one or more terminals. Transmitting the assignment message assigns power and/or power spectrum density to the one or more receivers.

In accordance with some aspects, the RLPC field can include a special value that indicates to the terminal that the terminal should retain its current RLPC value. This special value can be utilized in situations when the terminal adjusts its transmit PSD level directly based on fast interference control commands received from adjacent access points. In this situation, the serving access point might not be aware of the current PSD setting at the terminal due to the fast interference management. Therefore, the serving access point might decide to instruct the terminal to retain its current setting instead of overriding the setting.

Figure 7:
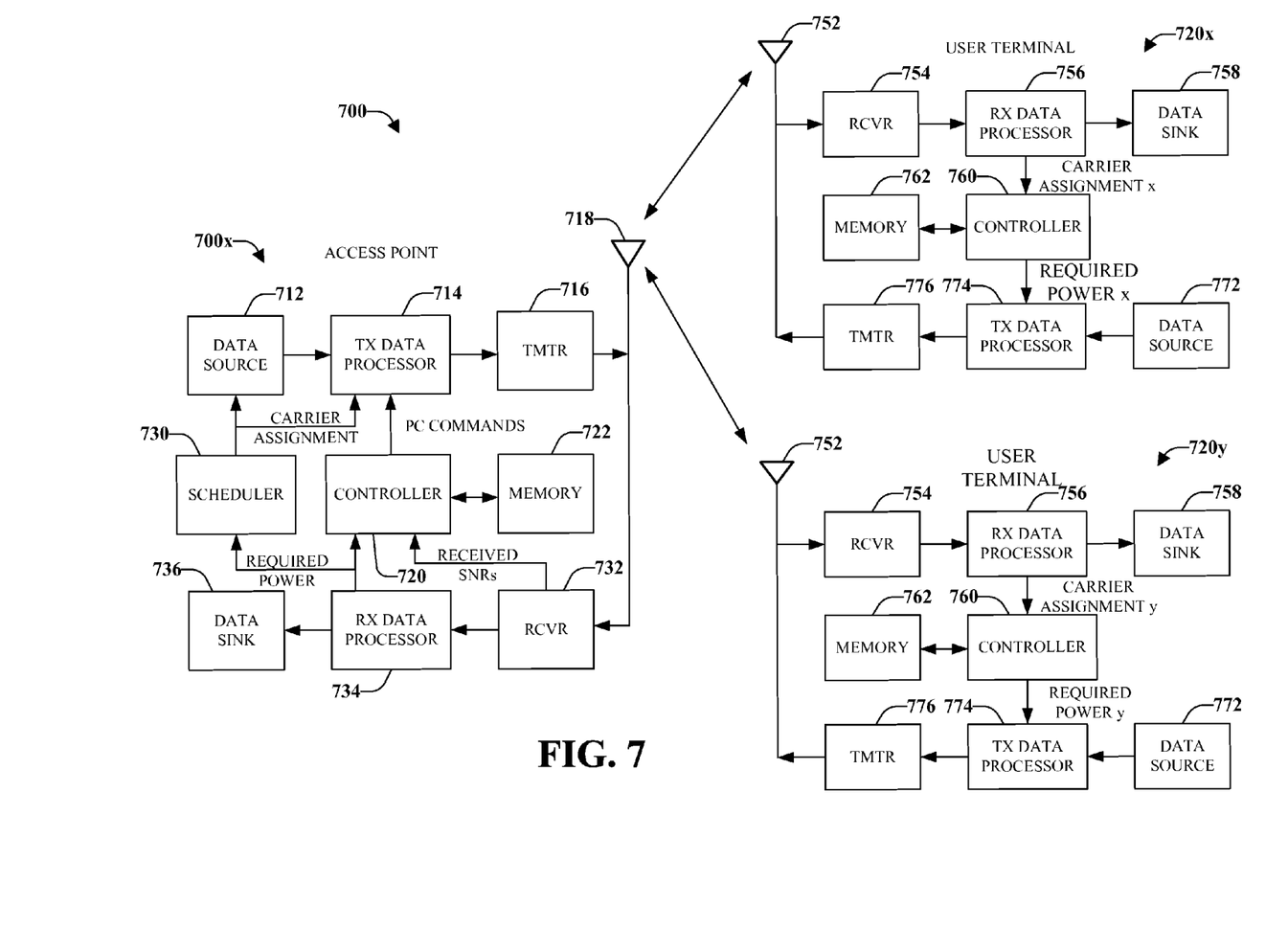
FIG. 7 illustrates a block diagram of an embodiment of an access point and two user terminals in a multiple-access multi-carrier communication system.

FIG. 7 illustrates a block diagram of an embodiment of an access point 700x and two user terminals 720x and 720y in multiple-access multi-carrier communication system 700. At access point 700x, a transmit (TX) data processor 714 receives traffic data {e.g., information bits) from a data source 712 and signaling and other information from a controller 720 and a scheduler 730. For example, controller 720 can provide power control (PC) commands that are used to adjust the transmit power of the active terminals, and scheduler 730 can provide assignments of carriers for the terminals. These various types of data may be sent on different transport channels. TX data processor 714 encodes and modulates the received data using multi-carrier modulation (e.g., OFDM) to provide modulated data (e.g., OFDM symbols). A transmitter unit (TMTR) 716 processes the modulated data to generate a downlink modulated signal that is transmitted from an antenna 718.

At each user terminal 720x and 720y, the transmitted and modulated signal is received by an antenna 752 and provided to a receiver unit (RCVR) 754. Receiver unit 754 processes and digitizes the received signal to provide samples. A received (RX) data processor 756 demodulates and decodes the samples to provide decoded data, which can include recovered traffic data, messages, signaling, and so on. The traffic data can be provided to a data sink 758, and the carrier assignment and PC commands sent for the terminal are provided to a controller 760.

Controller 760 directs data transmission on the uplink using the resources that have been assigned to the terminal and indicated in the received assignment. Controller 760 further injects the erasure signature packets when there is no actual data to transmit, yet controller 760 desires to keep the assigned resources.

Controller 720 directs data transmission on the downlink using the resources that have been assigned to the terminal. Controller 720 further injects the erasure signature packets when there is no actual data to transmit, yet controller 760 desires to keep the assigned resources.

For each active terminal 720, a TX data processor 774 receives traffic data from a data source 772 and signaling and other information from controller 760. For example, controller 760 can provide information indicative of channel quality information, required transmit power, the maximum transmit power, or the difference between the maximum and required transmit powers for the terminal. The various types of data are coded and modulated by TX data processor 774 using the assigned carriers and further processed by a transmitter unit 776 to generate an uplink modulated signal that is transmitted from antenna 752.

At access point 710x, the transmitted and modulated signals from the user terminals are received by antenna 718, processed by a receiver unit 732, and demodulated and decoded by an RX data processor 734. Receiver unit 732 an estimate the received signal quality (e.g., the received signal-to-noise ratio (SNR)) for each terminal and provide this information to controller 720. Controller 720 can derive the PC commands for each terminal such that the received signal quality for the terminal is maintained within an acceptable range. RX data processor 734 provides the recovered feedback information (e.g. the required transmit power) for each terminal to controller 720 and scheduler 730.

Scheduler 730 can provide an indication to controller 720 to maintain the resources. This indication is provided if more data is scheduled to be transmitted. For the access terminal 720x, the controller 760 can determine if resources are required to be maintained. In certain aspects, controller 720 an perform instructions that provide the functionality of scheduler 730.

Further, controller 720 can perform all or some of the functions discussed herein, individually or in any combination with respect to the access point. Further, controller 760 can perform all or some of the functions discussed herein, individually or in any combination with respect to the access terminal.

Figure 8:
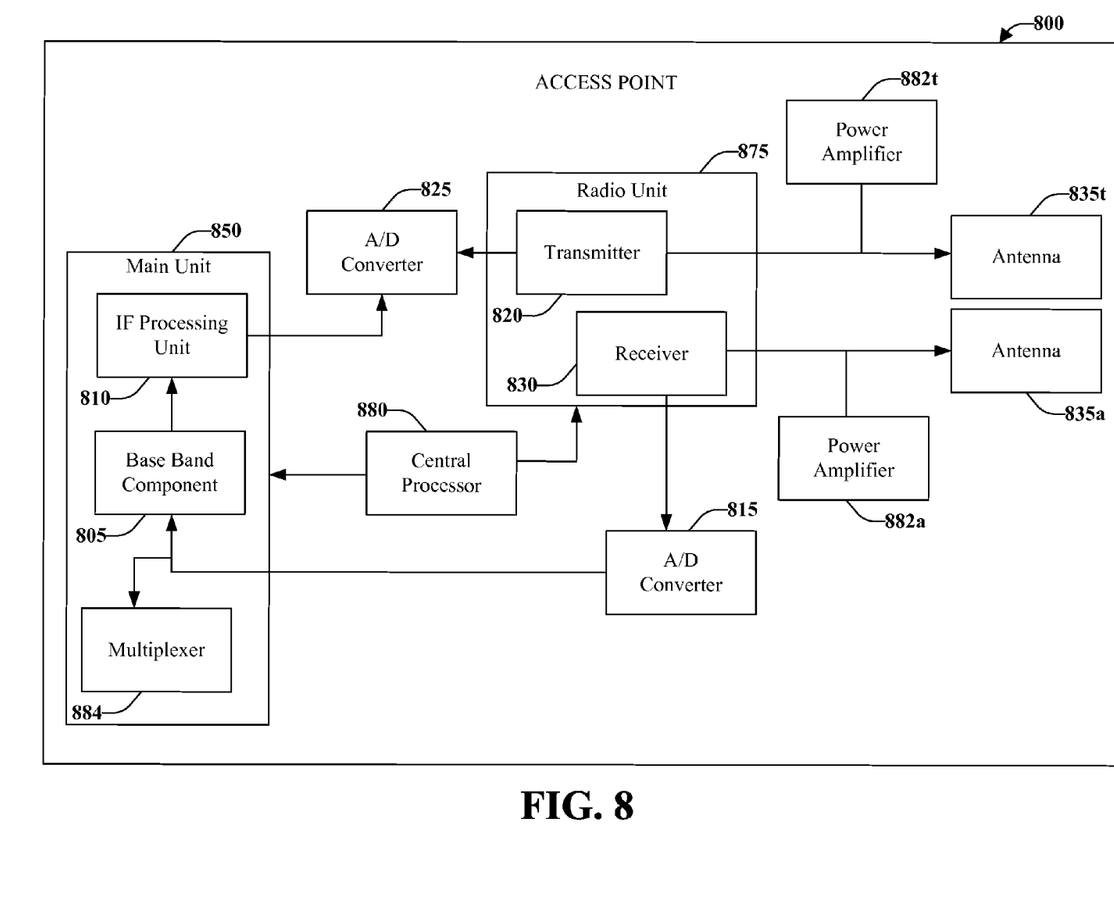
FIG. 8 illustrates an access point that can utilize one or more of the disclosed aspects.

FIG. 8 illustrates an access point 800 that can include a main unit (MU) 850 and a radio unit (RU) 875. MU 850 includes the digital baseband components of an access point. For example, MU 850 can include a baseband component 805 and a digital intermediate frequency (IF) processing unit 810. Digital IF processing unit 810 digitally processes radio channel data at an intermediate frequency by performing such functions as filtering, channelizing, modulation, and so forth. RU 875 includes the analog radio parts of the access point. As used herein, a radio unit is the analog radio parts of an access point or other type of transceiver station with direct or indirect connection to a mobile switching center or corresponding device. A radio unit typically serves a particular sector in a communication system. For example, RU 875 can include one or more receivers 830 connected to one more antennas 835a and 835t for receiving radio communications from mobile subscriber units. In an aspect, one or more power amplifiers 882a and 882t are coupled to one or more antennas 835a and 835t.

Connected to receiver 830 is an analog-to-digital (A/D) converter 825. A/D converter 825 converts the analog radio communications received by receiver 830 into digital input for transmission to baseband component 805 through digital IF processing unit 810. RU 875 can also include one or more transmitter 820 connected to either the same or different antenna 835 for transmitting radio communications to access terminals. Connected to transmitter 820 is a digital-to-analog (D/A) converter 815. D/A converter 815 converts the digital communications received from baseband component 805 through digital IF processing unit 810 into analog output for transmission to the mobile subscriber units.

In accordance with some embodiments, a multiplexer 884 for multiplexing of multiple-channel signals and multiplexing of a variety of signals including a voice signal and a data signal. A central processor 880 is coupled to main unit 850 and Radio Unit for controlling various processing which includes the processing of voice or data signal.

Figure 9:
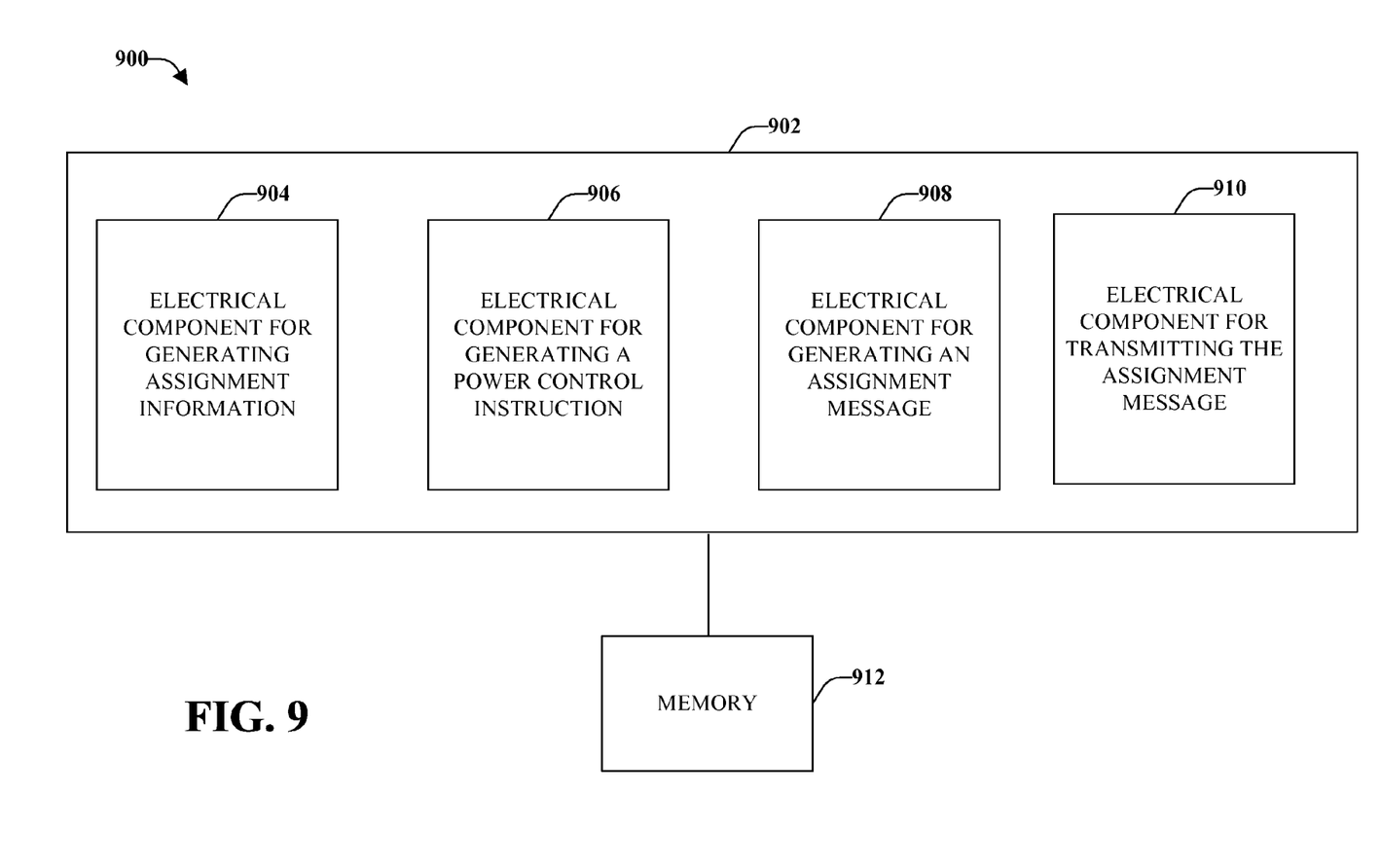
FIG. 9 illustrates an example system for transmitting an assignment message.

With reference to FIG. 9, illustrated is an example system 900 for transmitting an assignment message. For example, system 900 may reside at least partially within a base station. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. For instance, logical grouping 902 may include an electrical component for generating assignment information 904 for at least one terminal, and assigning reverse link transmission resources. Further, logical grouping 902 can comprise an electrical component for generating a power control instruction 906 of the at least one terminal for the assigned reverse link transmission resources. Also included is an electrical component for generating an assignment message 908. The assignment message can include both the assignment information and the power control instruction. Also included is an electrical component for transmitting the assignment message 910 to the at least one terminal.

Additionally, system 900 can include a memory 912 that retains instructions for executing functions associated with electrical components 904, 906, 908 and 910 or other components. While shown as being external to memory 912, it is to be understood that one or more of electrical components 904, 906, 908 and 910 or other components may exist within memory 912.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

As previously discussed, one or more aspects, each feature or concept described herein may be used in a wireless communication without any other feature or concept described herein. The features and concepts described herein can be implemented by various means. For example, these techniques can be implemented in hardware, software, or a combination thereof. For a hardware implementation, the processing units (e.g., controllers 720 and 760, TX and RX processors 714 and 734, and so on, of FIG. 7) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units on a removable media, or the like that can be read and executed by one or more processors. The memory unit (e.g., memory 722 or 762) may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for transmitting an assignment message, comprising:
    generating assignment information for at least one terminal, the assignment information includes assignment of reverse link transmission resources;
    generating a power control instruction of the at least one terminal for the assigned reverse link transmission resource based upon a packet format included in the assignment information;
    generating an assignment message that includes both the assignment information and the power control instruction; and
    transmitting the assignment message to the at least one terminal.

2. The method of claim 1, wherein generating the power control instruction comprises generating an n-bit number.

3. The method of claim 1, wherein the transmitting the assignment message assigns a power, a power spectrum density, or combinations thereof to the at least one terminal.

4. The method of claim 1, wherein the power control instruction is included in a reverse link power control channel (RLPC) field.

5. The method of claim 4, wherein the RLPC field contains a special value that indicates the at least one terminal should retain its current power spectral density value.

6. The method of claim 4, wherein the RLPC field includes a target carrier to interference ratio.

7. A wireless communications apparatus, comprising:
    a processor that executes instructions for generating an assignment message including both assignment information assigning reverse link transmission resources for at least one terminal and a power control instruction for the assigned reverse link transmission resources based upon a packet format included in the assignment information, and to instruct transmission of the assignment message to the at least one terminal; and
    a memory that stores information related to instructions generated by the processor.

8. The wireless communications apparatus of claim 7, wherein generating the power control instruction comprises generating an n-bit number.

9. The wireless communications apparatus of claim 7, wherein the transmitting the assignment message assigns a power, a power spectrum density, or combinations thereof to the at least one terminal.

10. The wireless communications apparatus of claim 9, wherein generating the power control instruction comprises generating an n-bit number.

11. The wireless communications apparatus of claim 7, wherein the power control instruction is included in a reverse link power control channel field.

12. The wireless communications apparatus of claim 11, wherein the RLPC field contains a special value that indicates the at least one terminal should retain its current power spectral density value.

13. The wireless communications apparatus of claim 11, wherein the RLPC field includes a target carrier to interference ratio.

14. A wireless communications apparatus that transmits an assignment message, comprising:
    means for generating assignment information for at least one terminal, assigning reverse link transmission resources;
    means for generating a power control instruction of the at least one terminal for the assigned reverse link transmission resources based upon a packet format included in the assignment information;
    means for generating an assignment message including both the assignment information and the power control instruction; and
    means for transmitting the assignment message to the at least one terminal.

15. The wireless communications apparatus of claim 14, wherein the transmitting the assignment message assigns a power, a power spectrum density, or combinations thereof to the at least one terminal.

16. The wireless communications apparatus of claim 14, wherein the power control instruction is included in a reverse link power control channel field.

17. The wireless communications apparatus of claim 16, wherein the RLPC field contains a special value that indicates the at least one terminal should retain its current power spectral density value.

18. The wireless communications apparatus of claim 16, wherein the RLPC field includes a target carrier to interference ratio.

19. A non-transitory machine-readable medium having stored thereon machine-executable instructions for:
    determining assignment information for at least one terminal, the assignment information includes assignment of reverse link transmission resources;
    creating a power control instruction of the at least one terminal for the assigned reverse link transmission resource based upon a packet format included in the assignment information;
    formatting an assignment message that includes both the assignment information and the power control instruction; and
    sending the assignment message to the at least one terminal.

20. An apparatus operable in a wireless communication system, the apparatus comprising:
    a processor configured to:
        determine assignment information for at least one terminal, the assignment information includes assignment of reverse link transmission resources;
        create a power control instruction of the at least one terminal for the assigned reverse link transmission resource based upon a packet format included in the assignment information;
        format an assignment message that includes both the assignment information and the power control instruction; and
        communicate the assignment message to the at least one terminal.

21. A method of wireless communication, comprising:
    receiving an assignment message at a terminal, the assignment message including:
        assignment information including assignment of reverse link transmission resources; and
        a power control instruction for the assigned reverse link transmission resources based upon a packet format included in the assignment information.

22. The method of claim 21, wherein the power control instruction comprises an n-bit number.

23. The method of claim 21, wherein the receiving the assignment message assigns at least one of a power, and a power spectrum density, to the terminal.

24. The method of claim 21, wherein the power control instruction is included in a reverse link power control channel (RLPC) field.

25. The method of claim 24, wherein the RLPC field contains a special value that indicates that the terminal should retain its current power spectral density value.

26. The method of claim 24, wherein the RLPC field includes a target carrier to interference ratio.

27. An apparatus operable in a wireless communication system, the apparatus comprising:
   a memory; and
   at least one processor coupled to the memory and configured:
      to receive an assignment message at a terminal, the assignment message including:
      assignment information including assignment of reverse link transmission resources; and
      a power control instruction for the assigned reverse link transmission resources based upon a packet format included in the assignment information.

28. A computer program product for wireless communications in a wireless network, comprising:
   non-transitory a computer-readable medium having program code recorded thereon, the program code comprising:
      program code to receive an assignment message at a terminal, the assignment message including:
      assignment information including assignment of reverse link transmission resources; and
      a power control instruction for the assigned reverse link transmission resources based upon a packet format in the assignment information.

29. An apparatus for wireless communication, comprising:
   means for receiving an assignment message by at least one terminal, the assignment message including:
      assignment information including assignment of reverse link transmission resources; and
      a power control instruction for the assigned reverse link transmission resources based upon a packet format in the assignment information; and
   means for transmitting in accordance with the received assignment message.

* * * * *

UNITED STATES PATENT AND TRADEMARK OFFICE
CERTIFICATE OF CORRECTION

| | |
|---|---|
| PATENT NO. | : 8,050,701 B2 |
| APPLICATION NO. | : 11/870962 |
| DATED | : November 1, 2011 |
| INVENTOR(S) | : Alexei Gorokhov |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this
Thirteenth Day of March, 2012

David J. Kappos
*Director of the United States Patent and Trademark Office*